United States Patent [19]

Kobayashi et al.

[11] Patent Number: 5,078,239
[45] Date of Patent: Jan. 7, 1992

[54] SHOCK ABSORBER WITH ADJUSTABLE DAMPING FORCE

[75] Inventors: Toshiki Kobayashi; Toshinobu Ishida; Yasumasa Hagiwara, all of Okazaki; Masayuki Yano, Aichi, all of Japan

[73] Assignees: Nippondenso Co., Ltd., Kariya; Nippon Soken, Inc., Nishio, both of Japan

[21] Appl. No.: 367,652

[22] Filed: Jul. 7, 1989

[30] Foreign Application Priority Data

Jul. 8, 1988 [JP] Japan .................. 63-171669

[51] Int. Cl.⁵ .................... F16F 9/49; F16F 9/46
[52] U.S. Cl. ................... 188/280; 188/299; 188/322.22
[58] Field of Search ............ 188/299, 319, 280, 282, 188/322.15, 322.22

[56] References Cited

U.S. PATENT DOCUMENTS

| | | | |
|---|---|---|---|
| 3,043,404 | 7/1962 | Peras | 188/280 |
| 4,084,667 | 4/1978 | Kurrat | 188/280 X |
| 4,620,619 | 11/1986 | Emura et al. | 188/322.22 X |
| 4,696,489 | 9/1987 | Fujishiro et al. | |
| 4,723,640 | 2/1988 | Beck | 188/319 |
| 4,729,459 | 3/1988 | Inagaki et al. | 188/319 X |

FOREIGN PATENT DOCUMENTS

| | | |
|---|---|---|
| 2230899 | 12/1974 | France . |
| 2607890 | 6/1988 | France .................. 188/322.22 |
| 55-27547 | 2/1980 | Japan . |
| 59-147134 | 8/1984 | Japan . |
| 61-67009 | 5/1986 | Japan . |

Primary Examiner—Robert J. Oberleitner
Attorney, Agent, or Firm—Cushman, Darby & Cushman

[57] ABSTRACT

A shock absorber which selectively produces different magnitudes of damping forces includes a cylinder and a piston slidably disposed in the cylinder and dividing an interior space of the cylinder into first and second fluid chambers filled with a fluid. A housing assembly coupled to the piston has a main fluid passage providing fluid communication between the first and second fluid chambers at all times and an auxiliary fluid passage providing selective fluid communication between the first and second fluid chambers. The auxiliary fluid passage can be opened to provide fluid communication between the first and second fluid chamber in response to an external control signal. The auxiliary fluid passage can be closed to cut off fluid communication between the first and second fluid chambers when the speed of relative movement of the cylinder and the piston is substantially zero, i.e., when the speed of expansion and contraction of the shock absorber is substantially zero.

28 Claims, 9 Drawing Sheets

SHOCK ABSORBER WITH ADJUSTABLE DAMPING FORCE

BACKGROUND OF THE INVENTION

1. Field of the Invention

The present invention relates to a shock absorber, and more particularly to a shock absorber having a mechanical structure for adjusting damping forces to be generated by the shock absorber.

2. Prior Art

One known shock absorber with adjustable damping force comprises a cylinder, a rod slidably inserted in the cylinder, and a piston mounted on an inner end of the rod and slidably fitted in the cylinder. The piston divides the interior space of the cylinder into first and second fluid chambers. The first and second fluid chambers are connected to each other by a fluid passage whose cross-sectional area can be varied by an actuator operable by an electric signal, thus adjusting damping forces to be generated by the shock absorber.

When damping forces are changed while the shock absorber is being expanded or contracted at a high speed, a change in the produced damping forces is large, and hence the shock absorber produces impact forces which tend to impair riding comfort.

Shock absorbers are generally designed such that it produces higher damping forces when they are expanded than when they are contracted. Therefore, when damping forces are changed in an expansion stroke, large impact forces are produced which makes riding comfort poor. It is preferable that damping forces be changed when the speed at which the shock absorber is expanded or contracted is zero, i.e., when the damping forces are zero. It is more preferable that damping forces be changed the instant the expansion stroke changes to the contraction stroke and when damping forces are zero and the speed of expansion or contraction is zero, or immediately after the expansion stroke changes to the contraction stroke, i.e., the damping forces in the contraction stroke are almost zero.

Heretofore, the actuator is controlled by an electronic control unit. The electronic control unit is operated according to various control programs based on a signal from a positional sensor which detects the expansion or contraction of the shock absorber, so that damping forces can be changed at an accurate time by the electric actuator. The entire system composed of the shock absorber, the electronic control unit, and the positional sensor is however complex in structure.

SUMMARY OF THE INVENTION

In view of the aforesaid problem of the conventional shock absorbers, it is an object of the present invention to provide an adjustable damping force type shock absorber which is capable of changing damping forces at an accurate time with a simple mechanical arrangement.

According to the present invention, there is provided a shock absorber for selectively producing different magnitudes of damping forces, comprising a cylinder, a piston slidably disposed in the cylinder and dividing an interior space of the cylinder into first and second fluid chambers filled with a fluid, means coupled to the piston and defining a main fluid passage providing fluid communication between the first and second fluid chambers at all times and an auxiliary fluid passage providing selective fluid communication between the first and second fluid chambers, and fluid passage control means for opening the auxiliary fluid passage to provide fluid communication between the first and second fluid chambers in response to an external control signal and for closing the auxiliary fluid passage to cut off fluid communication between the first and second fluid chambers when the speed of relative movement of the cylinder and the piston is substantially zero.

The fluid passage control means comprises an on-off valve including a valve body for selectively opening and closing the auxiliary fluid passage, a spring for normally urging the valve body to close the auxiliary fluid passage, and a fluid chamber for introducing and discharging a fluid in response to movement of the valve body to open and close the auxiliary fluid passage, an actuator responsive to the external control signal for moving the valve body to open the auxiliary fluid passage, and a control valve including a valve body movable in response to a force produced when the cylinder and the piston are moved relatively to each other, and a control fluid passage openable by the valve body of the control valve for bringing the fluid chamber of the on-off valve into communication with the main fluid passage to cause the on-off valve to close the auxiliary fluid passage when the speed of relative movement of the cylinder and the piston is substantially zero, and closable by the valve body of the control valve for keeping the fluid chamber of the on-off valve sealed in a fluidtight condition to cause the on-off valve to open the auxiliary fluid passage when the speed of relative movement of the cylinder and the piston is other than substantially zero.

The shock absorber further includes a check valve for releasing the fluid from the fluid chamber of the on-off valve to allow the on-off valve to open the auxiliary fluid passage regardless of whether the fluid passage is opened or closed by the valve body of the control valve.

The control valves has means for bringing the fluid chamber of the on-off valve into communication with the main fluid passage through the control fluid passage when the speed of relative movement of the cylinder and the piston is substantially zero and when the direction of relative movement of the cylinder and the piston changes from a shock absorber expansion stroke to a shock absorber contraction stroke.

The valve body of the control valve is movable under a frictional force from the cylinder for opening and closing the control fluid passage.

The valve body of the control valve comprises a spool valve body having one end subjected to a fluid pressure from the first fluid chamber and the other end to a fluid pressure from the second fluid chamber, the spool valve body being movable under the difference between the fluid pressures applied respectively to the ends thereof for opening and closing the control fluid passage.

The valve body of the control valve is movable under a fluid pressure in the main fluid passage for opening and closing the control fluid passage.

When the piston is slidably moved in the cylinder, the fluid, typically oil, in the cylinder flows between the first and second fluid chambers through the main fluid passage to dampen shocks applied to the shock absorber. Damping forces generated by the shock absorber can be changed by selectively opening and closing the auxiliary fluid passage.

When only the main fluid passage is open, the shock absorber operates in a high-damping-force mode. To open the auxiliary fluid passage, the actuator is operated to shift the on-off valve. When the main and auxiliary fluid passages are open, the shock absorber operates in a low-damping-force mode. To close the auxiliary fluid passage, the control valve is axially moved under a force generated when the cylinder and the piston are relatively moved, so that the control fluid passage is opened when the speed of relative movement of the cylinder and the piston is substantially zero, thereby releasing the fluid chamber of the on-off valve from the fluidtight condition, i.e., bringing the fluid chamber of the on-off valve into communication with the main fluid passage. The valve body of the on-off valve is moved under the bias of the spring to close the auxiliary fluid passage while introducing the fluid from main fluid passage through the fluid control passage into the fluid chamber of the on-off valve. The operation mode of the shock absorber now switches from the low-damping-force mode to the high-damping-force mode.

As described above, the switching from the low-damping-force mode to the high-damping-force mode is effected when the speed of relative movement of the cylinder and the piston, i.e., the speed of expansion and contraction of the shock absorber, is substantially zero. The operation mode switching is carried out only by a mechanical arrangement wherein the valve body of the control valve is axially moved under the force produced when the cylinder and the piston are moved relatively to each other.

The above and other objects, features and advantages of the present invention will become more apparent from the following description when taken in conjunction with the accompanying drawings in which preferred embodiments of the present invention are shown by way of illustrative example.

DETAILED DESCRIPTION

Like or corresponding reference numerals denote like or corresponding parts throughout views.

FIGS. 1 through 4 show a shock absorber with adjustable damping force according to a first embodiment of the present invention.

Figure 1:
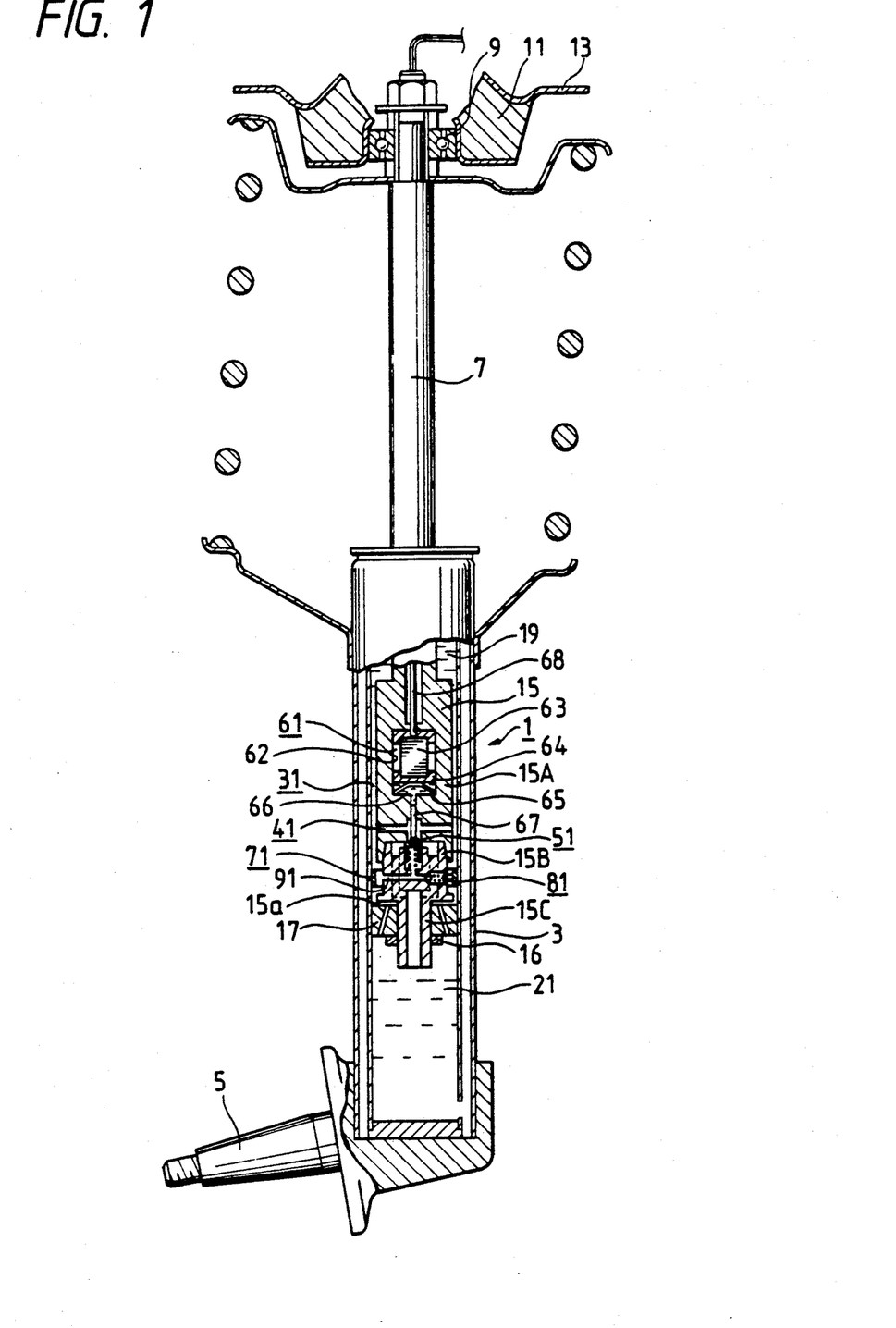
FIG. 1 is a vertical elevational view of an adjustable damping force type shock absorber according to a first embodiment of the present invention.

As shown in FIG. 1, a shock absorber 1 includes a cylinder 3 having a lower end fixed to an axle member 5 and a rod 7 having an upper end fixed to a vehicle body 13 through a bearing 9 and a vibroisolating rubber damper 11. The rod 7 has a lower portion inserted in the cylinder 3 and having on its lower end a housing assembly 15 which comprises a base member 15A, a joint member 15B partly threaded axially in the base member 15A, and a tubular member 15C extending axially from the joint member 15B. A piston 17 is threaded over and fixed by a nut 16 to the tubular member 15C. The piston 17 is axially slidably fitted in the cylinder 3 and divides the interior space of the cylinder 3 into a first fluid chamber 19 above the piston 17 and a second fluid chamber 21 below the piston 21. The first and second fluid chambers 19, 21 are held in communication with each other at all times by a main fluid passage 31 defined in the housing assembly 15 and the piston 17, and, additionally, is selectively brought into and out of communication with each other by an auxiliary fluid passage 41.

Figure 2:
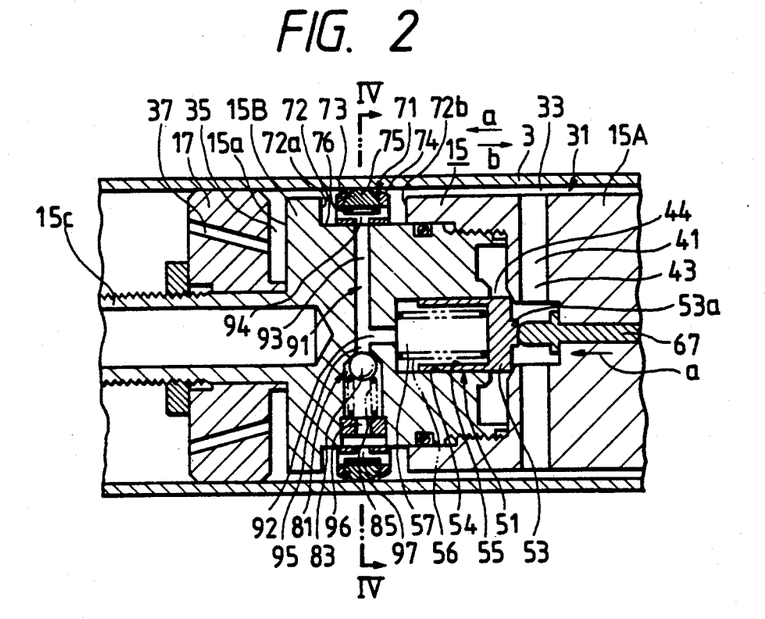
FIG. 2 is a fragmentary cross-sectional view of the shock absorber shown in FIG. 1, the view being taken along line II—II of FIG. 4.
Figure 3:
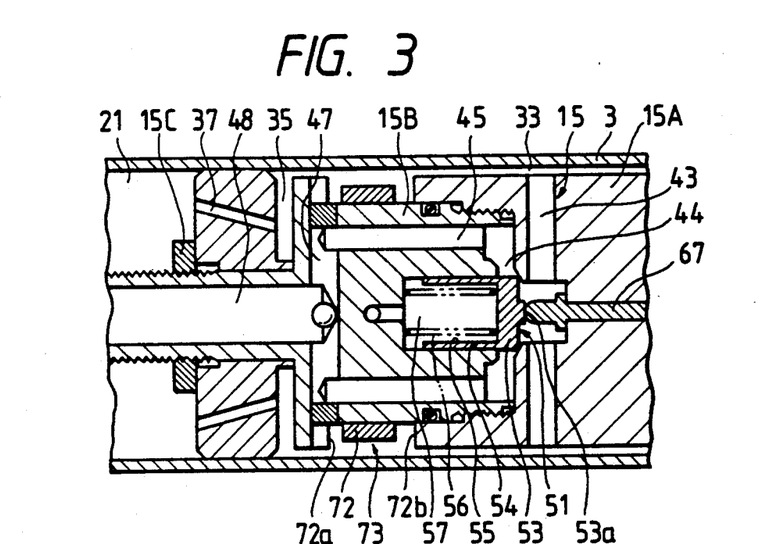
FIG. 3 is a fragmentary cross-sectional view of the shock absorber shown in FIG. 1, taken along line III—III of FIG. 4.
Figure 4:
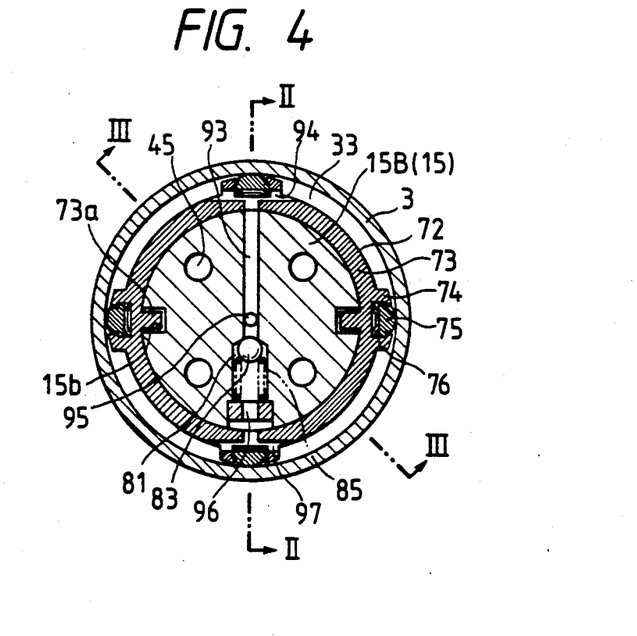
FIG. 4 is a cross-sectional view taken along line IV—IV of FIG. 2.

As shown in FIGS. 2 through 4, the main fluid passage 31 comprises a passageway 33 defined between the cylinder 3 and the housing assembly 15, a passageway 35 defined between an end surface 15a of the housing assembly 15 and the piston 17, and passageways 37 defined as restrictions in the piston 17. The auxiliary fluid passage 41 comprises four passageways 43 defined in the base member 15A in communication with the passageway 33 and extending radially outwardly from the central axis of the base member 15A, a passageway 44 which can selectively be connected to and disconnected from the passageways 43 by a poppet valve (on-off valve) 51, four passageways 45 connected to the passageway 44 and extending axially in the joint member 15B, four passageways 47 having radially outer ends connected respectively to the passageways 45 and radially inner ends joined together, and a passageway 48 connected to the joined ends of the passageways 47 and extending axially through the tubular member 15C. The auxiliary fluid passage 41 interconnects the first and second fluid chambers 19, 21 in bypassing relation to the passageways 37. The valve body 53 of the poppet valve 53 which is disposed in the passageway 44 serves to change damping forces to be generated by the shock absorber 1. The valve body 53 selectively opens and closes the auxiliary fluid passage 41 under the control of an actuator 61, a slide valve (on-off valve) 71, and a check valve 81.

As illustrated in FIG. 4, the actuator 61 comprises a laminated piezoelectric element 63 housed in a chamber 62 defined in the base member 15A, a piston 63 held against one end of the piezoelectric element 63, a Belleville spring 65 disposed in the chamber 62 for normally urging the piston 64 against the piezoelectric element 63, a noncompressible oil 66 filled in a fluidtight manner in a chamber defined between the bottom of the chamber 62 and the piston 64, and a plunger 67 axially slidable under the pressure of the oil 66. The actuator 61 is operable by an electric signal supplied from an electronic control unit (not shown) which operates based on a detected signal from a road surface sensor (not shown) or the like. When such an electric signal is applied to the piezoelectric element 63 through a lead wire 68, the piezoelectric member 63 is expanded to cause the piston 64 and the oil 66 to move the plunger 67 in the direction indicated by the arrow a. When the electric signal is not applied, the piezoelectric element 63 is contracted to allow the spring 65 to return the plunger 67 to its original position through the oil 66.

The valve body 53 of the poppet valve 51 is slidably fitted in a hole 54 defined axially in the joint member 15B. The valve body 53 is normally urged in a direction to close the auxiliary fluid passage 41 by means of a spring 56 disposed between the bottom of a bottomed hole 55 defined in the valve body 53 and the end of the hole 54. The valve body 53 has a central projection 53a on its outer end in axially confronting relation to the plunger 67. When the projection 53a is pushed by the plunger 67 in the direction indicated by the arrow a and when oil is discharged from a fluid chamber 57 defined by the hole 54 through a control fluid passage 91 (described later on), the valve body 53 is displaced to the left (FIG. 2) opening the auxiliary fluid passage 41. When the fluid chamber 57 is released of the fluid tight condition through the control fluid passage 91, i.e., it is brought into communication with the main fluid passage 31 through the control fluid passage 91, with the projection 53a not pushed by the plunger 67, the valve body 53 is displaced to the right under the bias of the spring 56, closing the auxiliary fluid passage 41.

The slide valve 71 comprises an annular valve body 73 axially slidably fitted in an annular groove 72 defined in the outer peripheral surface of the joint member 15B and having radially inwardly extending guide teeth 73a fitted respectively in guide slots 15b defined in the joint member 15B, four retainers 74 projecting radially outwardly from the outer peripheral surface of the annular valve body 73 and angularly spaced at equal intervals of 90°, with the passageway 33 being defined between the retainers 74, contact members 75 retained respectively by the retainers 74 and having outer peripheral surfaces held against the inner peripheral surface of the cylinder 3, and Belleville springs 76 disposed in the respective containers 74 for normally urging the contact members 74 toward the inner peripheral surface of the cylinder 3. The outer peripheral surface of each of the contact members 75 should preferably be made of a material having a large coefficient of friction of be roughened to provide large forces of friction between itself and the inner peripheral surface of the cylinder 3, or be of a semicylindrical shape complementary to the inner peripheral surface of the cylinder 3 to provide a large area of contact between itself and the inner peripheral surface of the cylinder 3.

The control fluid passage 91 has passageways 92, 93 connected to the fluid chamber 57 in the poppet valve 51, and a passageway 94 defined in a portion (in the upper side shown in FIG. 2) of the valve body 73. The annular valve body 73 is movable in the directions indicated by the arrows a, b between stoppers 72a, 72b at the axial ends of the annular groove 72, so that the annular valve body 73 selectively connects and disconnects the passageways 93, 94 to bring the fluid chamber 57 into and out of communication with the main fluid passage 31.

The check valve 81 is disposed in a passageway 95 defined in the joint member 15B and communicating with the fluid chamber 57. The check valve 81 can discharge the oil from the fluid chamber 57 into the main fluid passage 31 through the passageways 92, 95, a passageway 96 joined to the passageway 95, and a passageway 97 defined in the valve body 73 of the slide valve 71. The check valve 81 however prevents an oil flow in the opposite direction. The check valve 81 is of a general construction comprising a ball 83 and a spring 85 for biasing the ball 83.

Operation of the shock absorber 1 will be described below.

Figure 5:
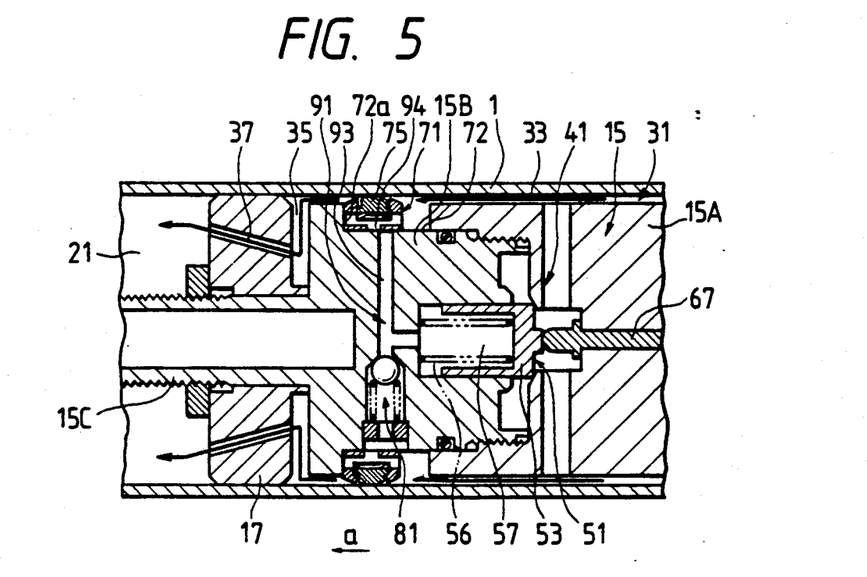
FIGS. 5 through 8 are fragmentary cross-sectional views showing a sequence of operation of the shock absorber illustrated in FIG. 1.
Figure 6:
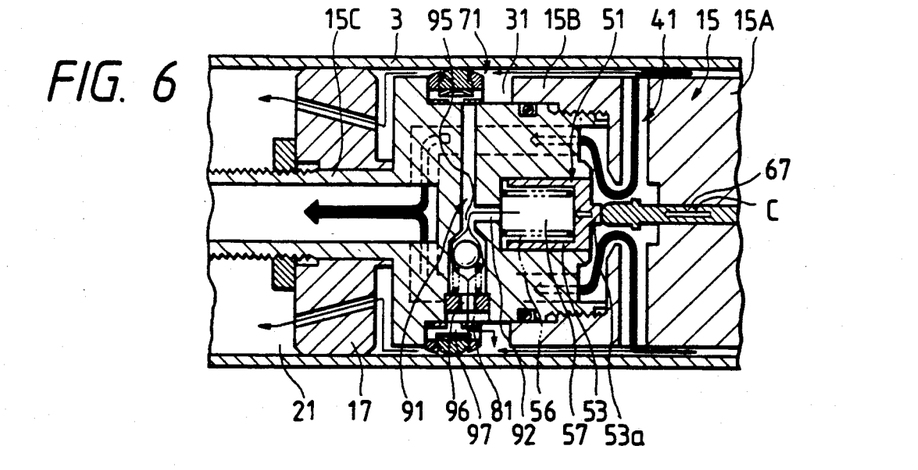

It is assumed that the shock absorber 1 is in a neutral position as shown in FIG. 2 with the poppet valve 51 closing the auxiliary fluid passage 41. When the shock absorber 1 is expanded in the direction indicated by the arrow a from the neutral position as shown in FIG. 5, the valve body 73 moves in unison with the cylinder 3 due to the friction between the outer surfaces of the contact members 75 and the inner peripheral surface of the cylinder 3. The valve body 73 is stopped when it engages the stopper 72a on one end of the annular groove 72. Since the passageway 94 in the valve body 73 is disconnected from the passageway 93 at this time, the fluid chamber 57 of the poppet valve 51 is held out of communication with, i.e., closed with respect to, the main fluid passage 31. Because the poppet valve 51 closes the auxiliary fluid passage 41 at this time, the oil in the first fluid chamber 19 does not flow through the auxiliary fluid passage 41, but flows only through the passageways 33, 35, 37 of the main fluid passage 31 into the second fluid chamber 21. Therefore, the shock absorber 1 operates to produce high damping forces. When an electric control signal is supplied from the electronic control unit to the piezoelectric element 63 with the shock absorber 1 being thus operated, the piezoelectric element 63 is expanded to cause the piston 64 and the oil 6 to move the plunger 67 in the direction indicated by the arrow c (FIG. 6). The distal end of the plunger 67 engages the projection 53a of the poppet valve 51, and pushes the valve body 53 against the bias of the spring 56. When pushed by the plunger 67, the valve body 53 opens the auxiliary fluid passage 44 while discharging the oil from the fluid chamber 57 into the main fluid passage 31 through the passageways 92, 95, 96, 97 and the check valve 81. The check valve 81 will be closed at the same time that the opening movement of the poppet valve 51 is completed. The oil in the first fluid chamber 19 therefore flows through the main fluid passage 31 and also the auxiliary fluid passage 41 into the second fluid chamber 21. Accordingly, the shock absorber 1 operates to produce low damping forces. As long as the cylinder 3 is moving in the direction indicated by the arrow a, the valve body 73 remains held against the stopper 72a, and hence the poppet valve 51 remains open as shown in FIG. 6.

Figure 7:
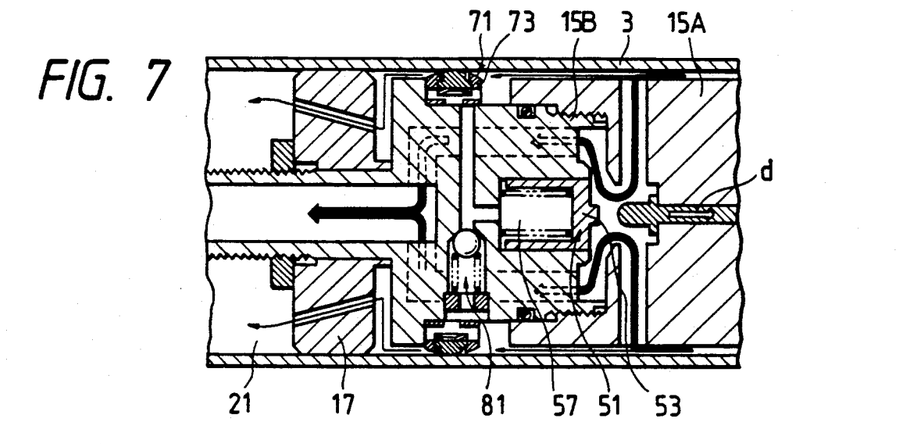

When the electric control signal from the electronic control unit is discontinued upon elapse of a certain period of time due to a time-up command signal from a timer in the electronic control unit, the piezoelectric element 63 is contracted to return the plunger 67 as indicated by the arrow d in FIG. 7. However, since the shock absorber 1 is in its expanded condition, the valve body 73 is not moved by the cylinder 3 and keeps the passageways 93, 94 out of communication with each other. The check valve 81 prevents the oil from flowing from the main fluid passage 31 into the fluid chamber 57. Therefore, since no oil is supplied from the main fluid passage 31 into the fluid chamber 57, the poppet valve 51 remains open as shown in FIG. 7.

Figure 8:
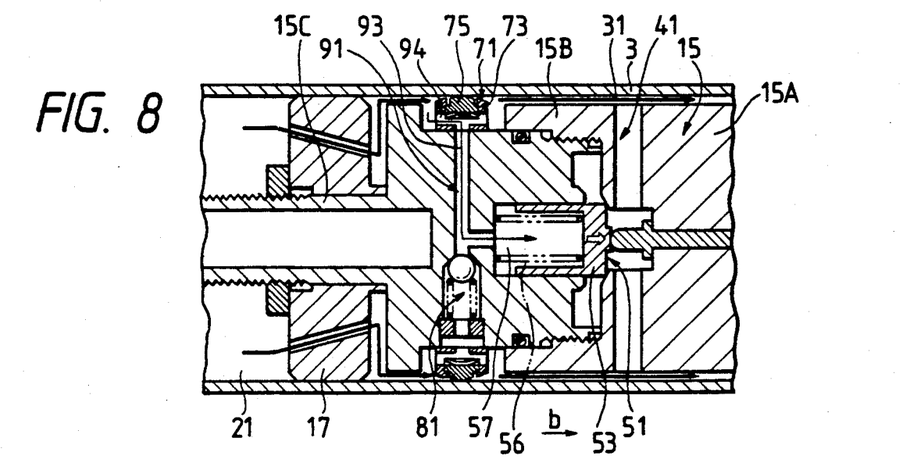

Now, the shock absorber 1 is contracted from the expanded condition and the cylinder 3 is moved in the direction indicated by the arrow b as shown in FIG. 8. At this time, the valve body 73 is moved with the cylinder 3 as indicated by the arrow b due to the friction between the inner peripheral surface of the cylinder 3 and the outer surfaces of the contact members 75. The instant the fluid passages 94, 93 are brought into radial registry with each other, the fluid chamber 57 communicates with the main fluid passage 31 through the control fluid passage 91. Therefore, the fluid chamber 57 is released of the fluidtight condition, and the valve body 53 of the poppet valve 51 is moved in the direction indicated by the arrow b under the resiliency of the spring 56. The poppet valve 51 now closes the auxiliary fluid passage 41 while the oil is being introduced from the main fluid passage 31 through the control fluid passage 91 into the fluid chamber 57. When the auxiliary fluid passage 41 is closed by the poppet valve 51, the shock absorber 1 is automatically switched from the low-damping-force mode to the high-damping-force mode. As the shock absorber 1 is continuously contracted, the valve body 73 slides with the cylinder 3 until it engages the stopper 72b. The fluid chamber 57 is now put out of communication with the main fluid passage 31, but the shock absorber 1 keeps on producing high damping forces unless the poppet valve 51 is opened.

Figure 9:
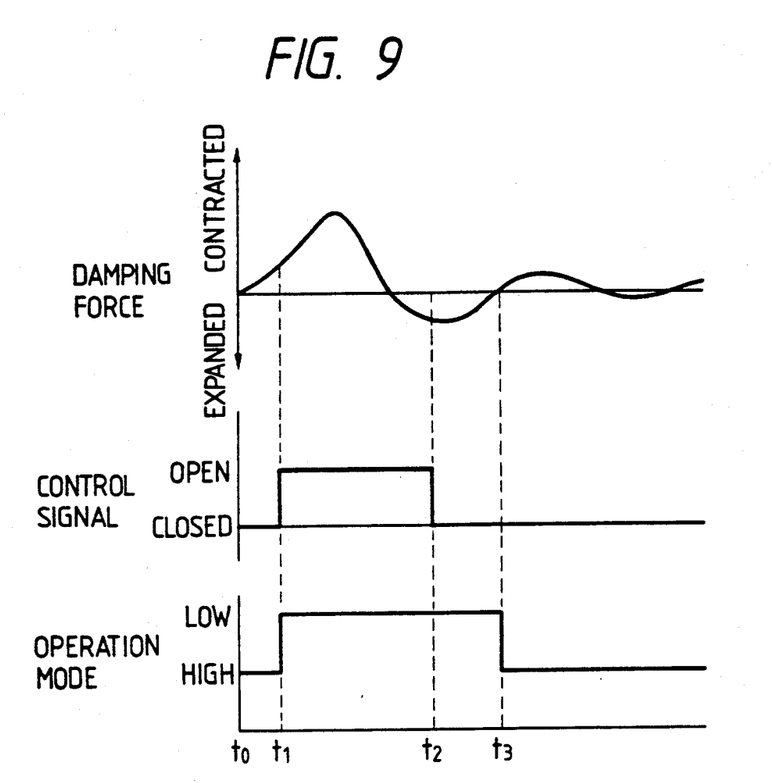
FIGS. 9 and 10 are graphs showing damping force characteristics of the shock absorber of FIG. 1.
Figure 10:
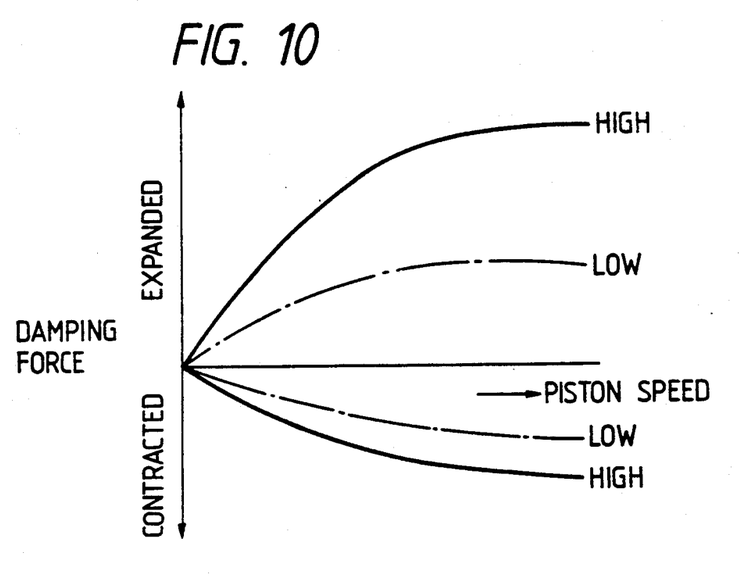

The above operation of the shock absorber 1 will be described in detail with respect to FIGS. 9 and 10. As shown in FIG. 9, the shock absorber 1 starts to be contracted at a time t0 from the neutral position (FIG. 1) to produce the high damping force. Thereafter, at a time t1, the actuator 61 is operated to enable the shock absorber 1 to produce the low damping force. The electric control signal is continuously applied to the actuator 61 until a time t2. Therefore, the poppet valve 51 remains open and the shock absorber 1 remains in the low-damping-force mode. At the time t2, the electric control signal applied to the actuator 61 is discontinued. However, the low damping force is maintained until a time t3 at which time the shock absorber 1 switches from the expanded condition to the contracted condition and the switching speed is almost zero. When the switching speed is zero, the poppet valve 51 is closed and the shock absorber 1 operates in the high-damping-force mode.

The operation mode of the shock absorber 1 can be changed from the high-damping-force mode to the low-damping-force mode at any time by applying the control signal to the actuator 61. However, the operation mode is changed from the low-damping-force mode to the high-damping-force mode only when the shock absorber 1 switches from the expanded condition to the contracted condition or vice versa and the switching speed is zero to operate the slide valve 71 and the poppet valve 51.

The above switching between the high- and low-damping-force modes offers the following advantages: As shown in FIG. 10, the shock absorber 1 is usually designed such that the higher the speed of movement of the piston 17, the greater the difference between the high and low damping forces produced by the shock absorber 1. Therefore, if the damping-force modes were changed when the piston speed is high, the shock absorber 1 would produce impact forces impairing riding comfort. According to the aforesaid embodiment, however, since the damping-force modes are changed when the damping forces are zero, i.e, when the speed of expansion and contraction of the shock absorber 1 is almost zero, produced damping forces do not vary greatly, and any impact or impulsive forces produced are of a low level which does not make riding comfort poor.

The damping-force modes are changed not by an electric arrangement, but by the mechanical arrangement including the slide valve 71 and the poppet valve 51. The employed mechanical construction is simple and highly reliable in operation.

While the four retainers 74 and the four contact members 75 are provided at equal angular intervals of 90° in the slide valve 71, three or six retainers and three or six contact members may be employed in view of slidability and balancing of the valve body 73.

FIGS. 11 through 14 illustrate an adjustable damping force type shock absorber according to a second embodiment of the present invention.

The shock absorber of the second embodiment differs from the shock absorber of the first embodiment except that a spool valve 101 is employed in place of the slide valve 71.

The spool valve 101 is incorporated in the joint member 15B of the housing assembly 15. The spool valve 101 comprises a spool valve body 103 slidably fitted in a hole 102 defined radially in the joint member 15B and having a substantially central annular groove 103a defined in the outer peripheral surface thereof, and a pair of springs 104a, 104b disposed in the hole 102 and acting on the respective opposite ends of the spool valve body 103 for normally urging the spool valve body 103 into a neutral position. The hole 102 has a port in one end thereof which communicates with the first fluid chamber (see FIG. 4) through a passageway 105 defined in the joint member 15B and the main fluid passage 31. The hole 102 also has a port in the other end which communicates with the second fluid chamber 21 through a passageway 106 defined in the joint member 15B. The hole 102 also has central ports, one communicating with the fluid chamber 57 through a passageway 113 defined in the joint member 15B and the other with the passageway 35 through a passageway 115 defined in the joint member 15B. The passageways 113, 115 jointly serve as a control fluid passage 111.

A check valve 81A has an upstream end connected to the fluid chamber 57 through a passageway 116 defined in the joint member 15B and a passageway 117 defined in a side wall of the valve body 53 of the poppet valve 51, and a downstream end connected to the main fluid passage 31 through a passageway 118 in the joint member 15B. The passageway 117 may be directly connected to the passageway 113 as with the first embodiment.

Figure 11:
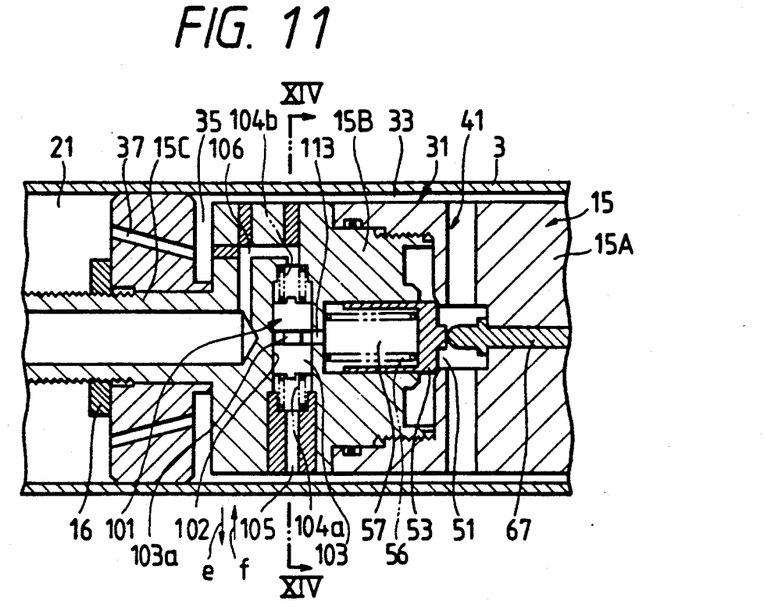
FIG. 11 is a fragmentary cross-sectional view of an adjustable damping force type shock absorber according to a second embodiment of the present invention, the view being taken along line XI—XI of FIG. 14.
Figure 12:
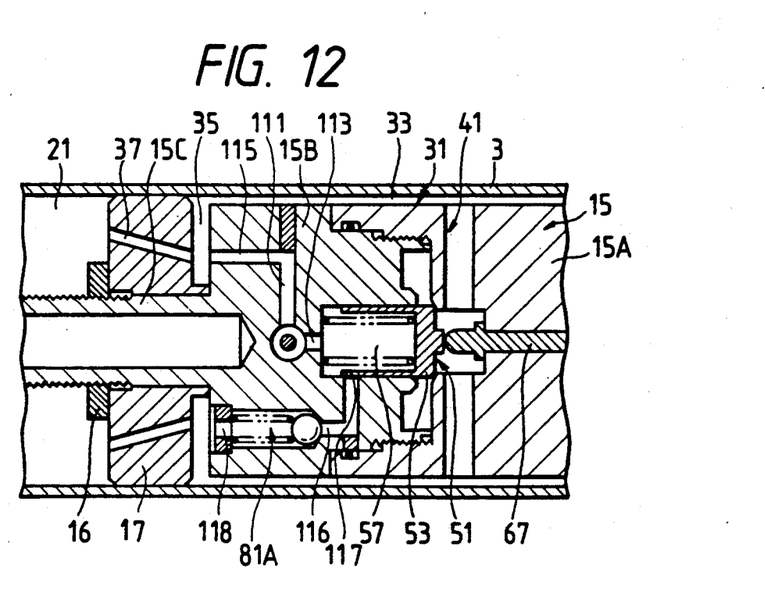
FIG. 12 is a fragmentary cross-sectional view of the shock absorber shown in FIG. 11, taken along line XII—XII of FIG. 14.
Figure 13:
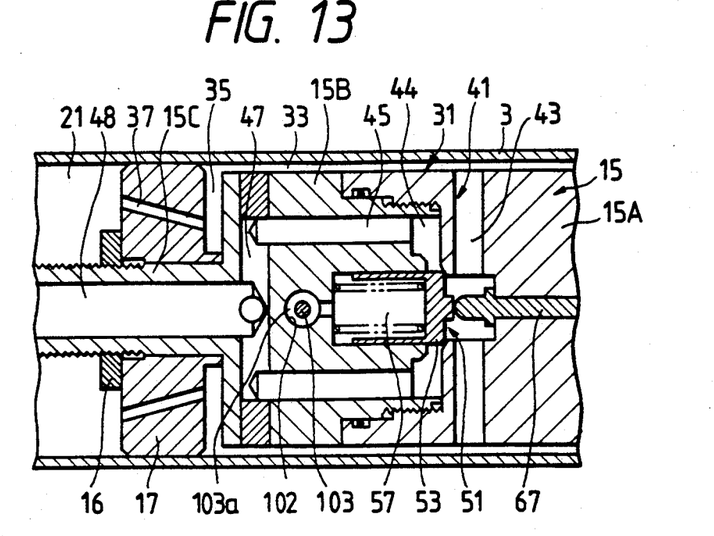
FIG. 13 is a cross-sectional view taken along line XIII—XIII of FIG. 14.
Figure 14:
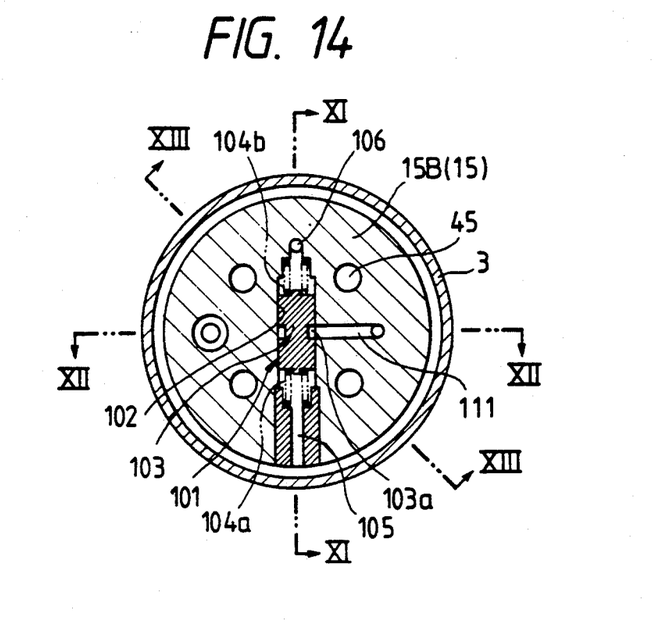
FIG. 14 is a cross-sectional view taken along line XIV—XIV of FIG. 11.

The shock absorber according to the second embodiment operates as follows: When the shock absorber is not expanded as shown in FIG. 11, the spool valve body 103 is in the neutral position as shown because the oil pressure applied from the first fluid chamber 19 through the passageway 105 to one end of the spool valve body 103 is equal to the oil pressure applied from the second fluid chamber 21 through the passageway 106 to the other end of the spool valve body 103, and also because the spring forces of the springs 104a, 104b are equal to each other. Therefore, the fluid chamber 57 communicates with the main fluid passage 31 through the passageway 113, the annular groove 103a, and the passageway 115.

When the actuator 61 (see FIG. 3) is operated to open the poppet valve 51, the operation mode of the shock absorber switches from the high-damping-force mode to the low-damping-force mode in the same manner as described above with reference to the first embodiment.

When the shock absorber is then expanded, the oil pressure in the first fluid chamber 19 becomes higher than the oil pressure in the second fluid chamber 21. Therefore, the oil pressure applied from the first fluid chamber 19 to one end of the spool valve body 103 through the passageway 105 becomes higher than the oil pressure applied from the second fluid chamber 21 to the other end of the spool valve body 103 through the passageway 106. The spool valve body 103 is now moved in the direction indicated by the arrow f (FIG. 11) against the bias of the spring 104b. As a consequence, the spool valve body 103 brings the passageways out of communication with each other, whereupon the fluid chamber 57 is disconnected from the main fluid passage 31.

When the shock absorber is contracted, the oil pressures applied to the ends of the spool valve body 103 are reversed in magnitude, and hence the spool valve body 103 is moved in the direction of the arrow e against the resiliency of the spring 104a. The instant the annular groove 103a allows communication between the passageways 113, 115, the fluid chamber 57 is connected to the main fluid passage 31. The fluid chamber 57 is now released of the fluidtight condition, allowing the valve body 53 to close the auxiliary fluid passage 41 under the force of the spring 56. Therefore, the damping-force mode of the shock absorber is automatically switched from the low-damping-force mode to the high-damping-force mode.

Figure 15:
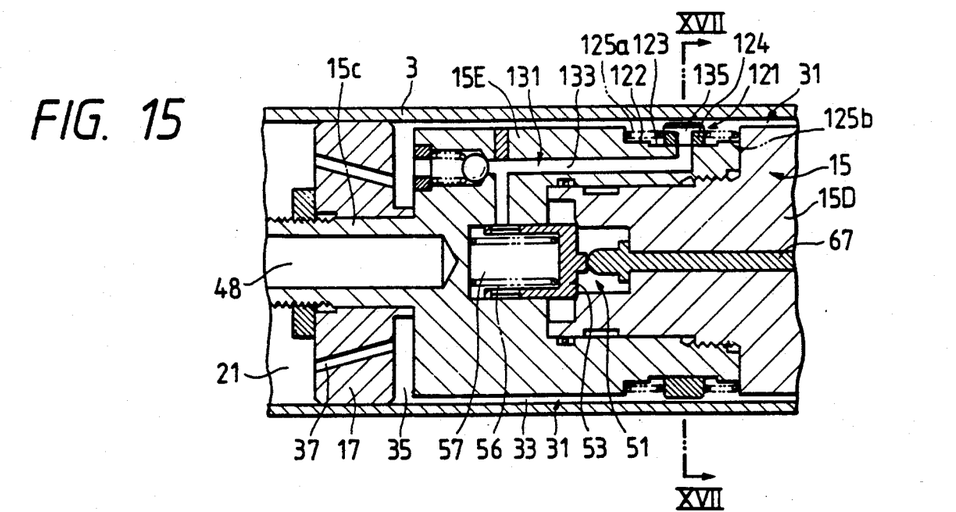
FIGS. 15 and 16 are cross-sectional views of an adjustable damping force type shock absorber according to a third embodiment of the present invention, the views being taken along line XV—XV and XVI—XVI of FIG. 17.
Figure 16:
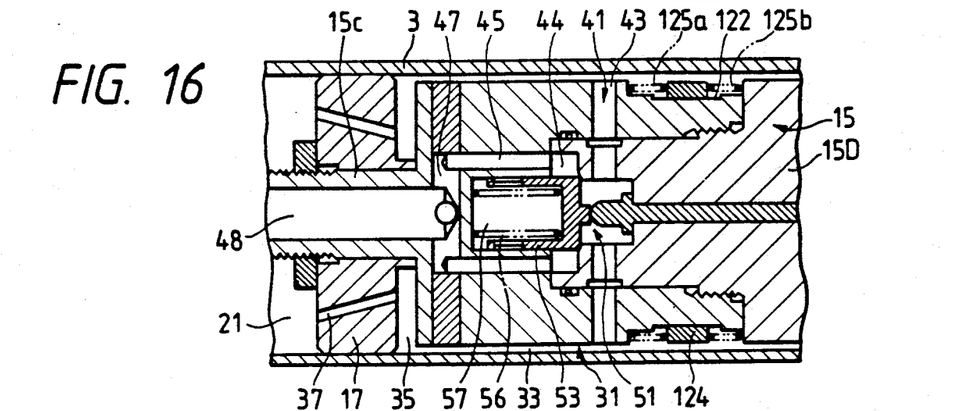
Figure 17:
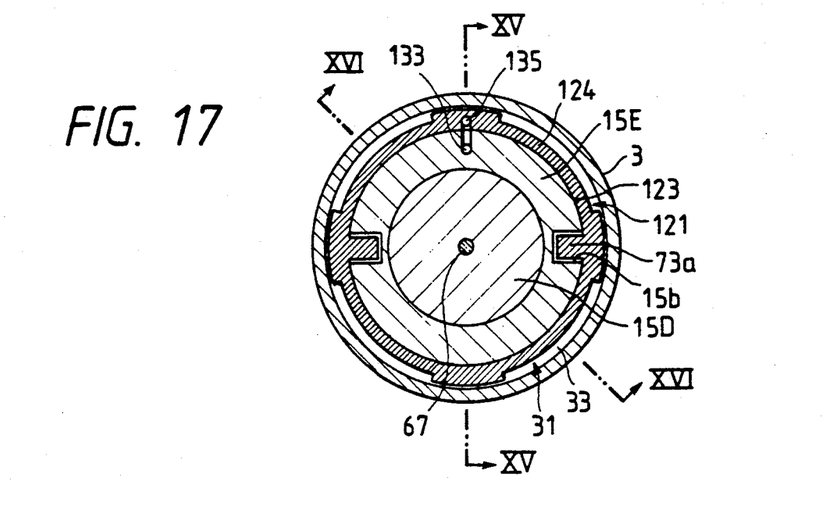
FIG. 17 is a cross-sectional view taken along line XVII—XVII of FIG. 15.

An adjustable damping force type shock absorber according to a third embodiment of the present invention will be described with reference to FIGS. 15 through 17.

The shock absorber according to the third embodiment differs from the shock absorber according to the first embodiment in that it employs a slide valve 121 of a different structure.

The housing assembly 15 includes a joint member 15E threaded over a base member 15D. The joint member 15E has an outer annular groove 122 defined in the outer peripheral surface thereof on the righthand side (as shown) of the auxiliary fluid passage 41, and an inner annular groove 123 defined centrally in the outer annular groove 122. The slide valve 151 includes an axially slidable annular valve body 124 disposed in the inner annular groove 123 and held out of contact with the inner peripheral surface of the cylinder 3. Springs 125a, 125b are supported on the opposite end surfaces of the outer annular groove 122 for acting on the opposite axial ends of the annular valve body 124. The valve body 124 has a passageway 135 defined therein. The passageway 135 and another passageway 133 defined in the joint member 15E jointly serve as control fluid passage 131.

Operation of the shock absorber according to the third embodiment will be described below. The valve body 124 is kept in a neutral position in FIG. 15 because the oil pressure applied from the first fluid chamber 19 through the main fluid passage 31 to one axial end of the valve body 124 is equal to the oil pressure applied from the second fluid chamber 21 through the main fluid passage 31 to the other axial end of the valve body 124, and also because the springs 125a, 125b have equal spring forces.

When the shock absorber is expanded from the neutral position, the oil in the first fluid chamber 19 flows through the main fluid passage 31 into the second fluid chamber 21. At this time, the valve body 124 moves in the same direction as the oil flow under the pressure of the oil flowing through the main fluid passage 31. As a result, the passageway 135 is shifted out of registry with the passageway 133, and the fluid chamber 57 of the poppet valve 51 is brought out of communication with the main fluid chamber 31.

When the shock absorber is contracted from the expanded condition, the oil flow is reversed, causing the valve body 124 to slide in the opposite direction. The instant the passageways 135, 133 are brought into registry with each other, and the fluid chamber 57 communicates with the main fluid passage 31, whereupon the poppet valve 51 which has been open is closed. The operation mode of the shock absorber switches from the low-damping-force mode to the high-damping-force mode.

With the third embodiment, therefore, the valve body 124 of the slide valve 121 axially slides under the dynamic pressure of the oil flowing through the main fluid passage 31 to close and open the control fluid passage 131. When the control fluid passage 131 is connected to the main fluid passage 31, the poppet valve 51 is closed, and the operation mode switches from the low-damping-force mode to the high-damping-force mode.

The poppet valve 51 may be opened to switch the operation mode from the high-damping-force mode to the low-damping-force mode at any time by operating the actuator 61.

While the slide valve 121 is positioned on the righthand side of the axially fluid passage 41, i.e., on the righthand side of a point where the auxiliary fluid passage 41 is branched from the main fluid passage 31, the slide valve 121 may be positioned on the lefthand side of the auxiliary fluid passage 41, i.e., at a position closer to the second fluid chamber 21. With such a modification, the absolute value of the dynamic pressure of the fluid applied to the slide valve 124 is lower than the pressure in the third embodiment. However, the slide valve body can still slide axially on the joint member 15E, making it possible to change damping forces.

In each of the first through third embodiments, the check valve is employed to release the oil from the fluid chamber 57 for opening the poppet valve 51. However, another means may be employed to allow the poppet valve 51 to be opened, as shown in FIG. 18.

Figure 18:
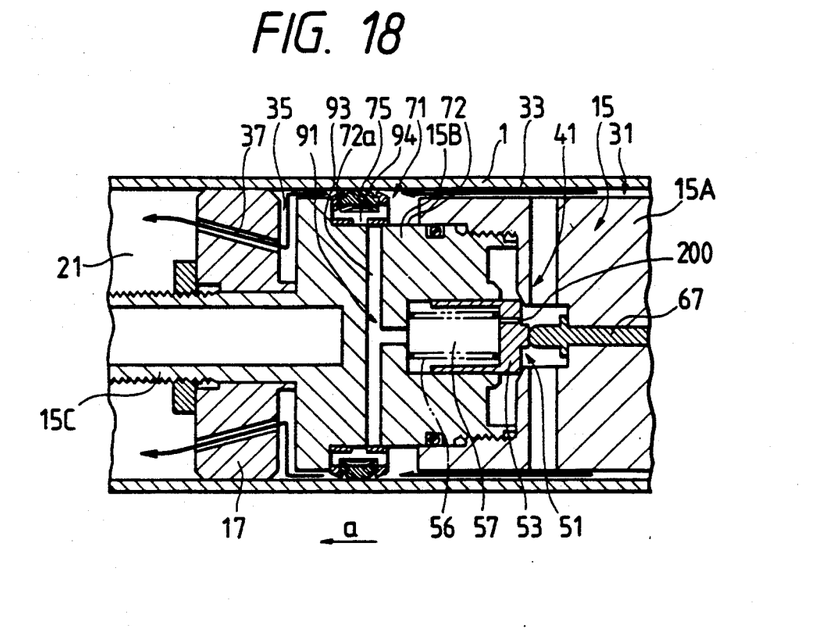
FIG. 18 is a fragmentary cross-sectional view of an adjustable damping force type shock absorber according to a fourth embodiment of the present invention.

In the embodiment shown in FIG. 18, no check valve is used, but a restriction hole 200 is defined axially through the poppet valve 51. When the plunger 67 pushes open the plunger 67 with the control fluid passage 21 closed, the oil in the fluid chamber 57 flows out through the restriction hole 200. Since the oil flows out of the fluid chamber 57 through the restriction hole 200 at a small rate, the poppet valve 51 is opened relatively slowly, and no abrupt change is caused in damping forces generated by the shock absorber. While the control fluid passage 91 is open, the poppet valve 51 can quickly be closed and opened.

The restriction hole 200 may be provided in addition to the check valve employed in each of the first through three embodiments. More specifically, if the shock absorber is expanded and contracted at a very high speed, then a small amount of oil may flow out of the fluid chamber through the gap around the valve body 53, letting the poppet valve 51 be open unexpectedly. With the restriction hole 200 provided, however, the pressure in the fluid chamber 57 is prevented from varying undesirably, and the poppet valve 51 can be operated stably.

According to the embodiment shown in FIG. 18, when the shock absorber is expanded and contracted at a high speed, i.e., when damping forces are large, the poppet valve 51 is opened slowly to reduce abrupt changes in damping forces at the time the operation mode switches from the high-damping-force mode to the low-damping-force mode. When the speed of expansion and contraction of the shock absorber is low, the poppet valve 51 is opened quickly to provide good damping force controlling characteristics.

Figure 19:
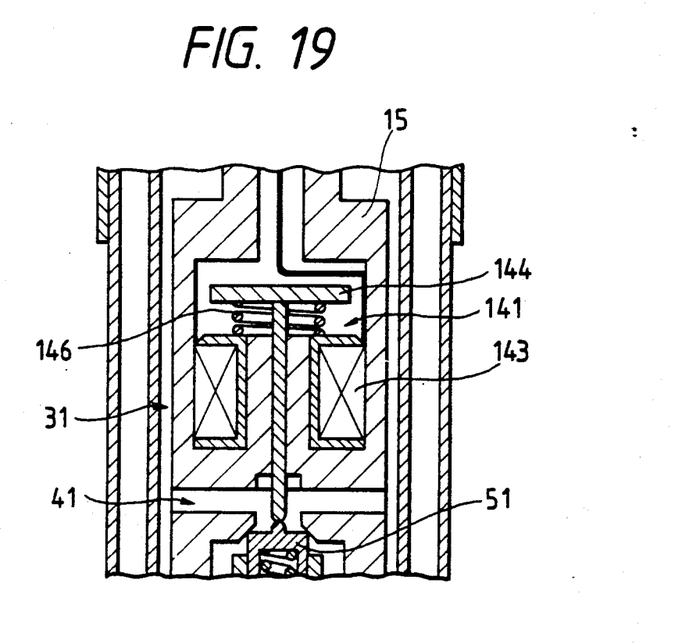
FIG. 19 is a fragmentary cross-sectional view of an actuator and associated parts in a shock absorber according to still another embodiment of the present invention.

In each of the above embodiments, the laminated piezoelectric element is employed as the actuator for opening the poppet valve. However, as shown in FIG. 19, a solenoid-operated actuator 141 may be employed which includes a solenoid coil 143 and a plunger 144 extending axially through the solenoid coil 143. When the solenoid coil 143 is energized, the plunger 144 is axially moved against the bias of a spring 146 to open the poppet valve 51. Alternatively, a drive unit such as a motor or the like may be employed to move the plunger.

The poppet valve 51 for opening and closing the auxiliary fluid passage 41 in the above embodiments may be replaced with a spool valve.

With the present invention, the operation mode of the shock absorber is switched from the low-damping-force mode to the high-damping-force mode by a mechanical arrangement which employs a hydraulic pressure circuit that utilizes a force produced when the cylinder and the piston are relatively moved, but not by the conventional complex electric arrangement.

Since the operation mode of the shock absorber is switched from the low-damping-force mode to the high-damping-force mode when produced damping forces are zero or almost zero, any shocks or impact forces produced by the shock absorber are small, and riding comfort is not impaired.

Although certain preferred embodiments have been shown and described, it should be understood that many changes and modifications may be made therein without departing from the scope of the appended claims.

What is claimed is:

1. A shock absorber comprising:
   a cylinder;
   a piston slidably fitted in said cylinder and dividing an interior space of said cylinder into first and second fluid chambers;
   a main fluid passage through which said first and second fluid chambers communicate with each other at all times;
   an auxiliary fluid passage through which said first and second fluid chambers selectively communicate with each other in bypassing relation to said main fluid passage; and
   a mechanism for selectively opening and closing said auxiliary fluid passage to selectively produce two different magnitudes of damping forces;
   said mechanism comprising:
      an on-off valve including a valve body for selectively opening and closing said auxiliary fluid passage, a spring for normally urging said valve body to close said auxiliary fluid passage, and a fluid chamber for introducing and discharging a fluid in response to movement of said valve body to open and close said auxiliary fluid passage;
      an actuator responsive to an electric control signal for moving said valve body to open said auxiliary fluid passage; and
      a control valve including a valve body movable in response to a force produced when said cylinder and said piston are moved relatively to each other, and a control fluid passage openable by said valve body of the control valve for bringing said fluid chamber of said on-off valve into communication with said main fluid passage to cause said on-off valve to close said auxiliary fluid passage when the speed of relative movement of said cylinder and said piston is substantially zero, and closable by said valve body of the control valve for keeping said fluid chamber of said on-off valve sealed in a fluidtight condition to cause said on-off valve to open said auxiliary fluid passage when the speed of relative movement of said cylinder and said piston is other than substantially zero.

2. A shock absorber according to claim 1, further including a check valve for releasing the fluid from said fluid chamber of said on-off valve to allow the on-off valve to open said auxiliary fluid passage regardless of whether said fluid passage is opened or closed by said valve body of said control valve.

3. A shock absorber according to claim 1 or 2, wherein said control valve has means for bringing said fluid chamber of said on-off valve into communication with said main fluid passage through said control fluid passage when the speed of relative movement of said cylinder and said piston is substantially zero and when the direction of relative movement of said cylinder and said piston changes from a shock absorber expansion stroke to a shock absorber contraction stroke.

4. A shock absorber as claimed in claim 3 wherein said valve body of said control valve is moveable under a frictional force from said cylinder for opening and closing said control fluid passage.

5. A shock absorber according to claim 1, wherein said valve body of said control valve is movable under a frictional force from said cylinder for opening and closing said control fluid passage.

6. A shock absorber according to any on of claims 1 or 2, wherein said valve body of said control valve comprises a spool valve body having one end subjected to a fluid pressure from said first fluid chamber and the other end to a fluid pressure from said second fluid chamber, said spool valve body being movable under the difference between said fluid pressures applied respectively to the ends thereof for opening and closing said control fluid passage.

7. A shock absorber according to any one of claims 1 or 2, wherein said valve body of said control valve is movable under a fluid pressure in said main fluid passage for opening and closing said control fluid passage.

8. A shock absorber according to claim 1, further including a housing assembly coupled to said piston, said main fluid passage being defined in said housing assembly and said piston, said auxiliary fluid passage being defined in said housing assembly, said mechanism being housed in said housing assembly.

9. A shock absorber according to claim 8, wherein said valve body of said on-off valve comprises a poppet valve body axially movably disposed in said auxiliary fluid passage, and said valve body of said control valve comprises an annular slide valve body axially slidably disposed in an annular groove defined in an outer peripheral surface of said housing assembly.

10. A shock absorber according to claim 9, wherein said control valve further includes a pair of springs acting on axially opposite ends of said slide valve body for normally urging said slide valve body into a position to open said control fluid passage.

11. A shock absorber according to claim 9, wherein said actuator comprises a laminated piezoelectric element operable by said electric control signal, and a plunger having one end held against said poppet valve body and movable by said laminated piezoelectric element.

12. A shock absorber according to claim 8, wherein said valve body of said on-off valve comprises a poppet valve body axially movably disposed in said auxiliary fluid passage, and said valve body of said control valve comprises a spool valve body radially slidably disposed in a hole defined in said housing assembly.

13. A shock absorber according to claim 12, wherein control valve further includes a pair of springs acting on axially opposite ends of said spool valve body for normally urging said spool valve body into a position to open said control fluid passage.

14. A shock absorber according to claim 12, wherein said actuator comprises a laminated piezoelectric element operable by said electric control signal, and a plunger having one end held against said poppet valve body and movable by said laminated piezoelectric element.

15. A shock absorber for selectively producing different magnitudes of damping forces, comprising:
a cylinder;
a piston slidably disposed in said cylinder and dividing an interior space of the cylinder into first and second fluid chambers filled with a fluid;
means coupled to said piston and defining a main fluid passage providing fluid communication between said first and second fluid chambers at all times and an auxiliary fluid passage providing selective fluid communication between said first and second fluid chambers; and
fluid passage control means for opening said auxiliary fluid passage to provide fluid communication between said first and second fluid chambers in response to an external control signal and for closing said auxiliary fluid passage to cut off fluid communication between said first and second fluid chambers when the speed of relative movement of said cylinder and said piston is substantially zero.

16. A shock absorber according to claim 15, wherein said fluid passage control means comprises:
an on-off valve including a valve body for selectively opening and closing said auxiliary fluid passage, a spring for normally urging said valve body to close said auxiliary fluid passage, and a fluid chamber for introducing and discharging a fluid in response to movement of said valve body to open and close said auxiliary fluid passage;
an actuator responsive to the external control signal for moving said valve body to open said auxiliary fluid passage; and
a control valve including a valve body movable in response to a force produced when said cylinder and said piston are moved relatively to each other, and a control fluid passage openable by said valve body of the control valve for bringing said fluid chamber of said on-off valve into communication with said main fluid passage to cause said on-off valve to close said auxiliary fluid passage when the speed of relative movement of said cylinder and said piston is substantially zero, and closable by said valve body of the control valve for keeping said fluid chamber of said on-off valve sealed in a fluidtight condition to cause said on-off valve to open said auxiliary fluid passage when the speed of relative movement of said cylinder and said piston is other than substantially zero.

17. A shock absorber according to claim 16, further including a check valve for releasing the fluid from said fluid chamber of said on-off valve to allow the on-off valve to open said auxiliary fluid passage regardless of whether said fluid passage is opened or closed by said valve body of said control valve.

18. A shock absorber according to claim 16, wherein said control valve has means for bringing said fluid chamber of said on-off valve into communication with said main fluid passage through said control fluid passage when the speed of relative movement of said cylinder and said piston is substantially zero and when the direction of relative movement of said cylinder and said piston changes from a shock absorber expansion stroke to a shock absorber contraction stroke.

19. A shock absorber according to claims 16 or 17, wherein said valve body of said control valve is movable under a frictional force from said cylinder for opening and closing said control fluid passage.

20. A shock absorber according to claims 16 or 17, wherein said valve body of said control valve comprises a spool valve body having one end subjected to a fluid pressure from said first fluid chamber and the other end to a fluid pressure from said second fluid chamber, said spool valve body being movable under the difference between said fluid pressures applied respectively to the ends thereof for opening and closing said control fluid passage.

21. A shock absorber according to claims 16 or 17, wherein said valve body of said control valve is movable under a fluid pressure in said main fluid passage for opening and closing said control fluid passage.

22. A shock absorber according to claim 16, further including a housing assembly coupled to said piston, said main fluid passage being defined in said housing assembly and said piston, said auxiliary fluid passage being defined in said housing assembly, said mechanism being housed in said housing assembly.

23. A shock absorber according to claim 16, wherein said valve body of said on-off valve comprises a poppet valve body axially movably disposed in said auxiliary fluid passage, and said valve body of said control valve comprises an annular slide valve body axially slidably disposed in an annular groove defined in an outer peripheral surface of said housing assembly.

24. A shock absorber according to claim 23, wherein control valve further includes a pair of springs acting on axially opposite ends of said slide valve body for normally urging said slide valve body into a position to open said control fluid passage.

25. A shock absorber according to claim 23, wherein said actuator comprises a laminated piezoelectric element operable by said electric control signal, and a plunger having one end held against said poppet valve body and movable by said laminated piezoelectric element.

26. A shock absorber according to claim 16, wherein said valve body of said on-off valve comprises a poppet valve body axially movably disposed in said auxiliary fluid passage, and said valve body of said control valve comprises a spool valve body radially slidably disposed in a hole defined in said housing assembly.

27. A shock absorber according to claim 26, wherein said control valve further includes a pair of springs acting on axially opposite ends of said spool valve body for normally urging said spool valve body into a position to open said control fluid passage.

28. A shock absorber according to claim 26, wherein said actuator comprises a laminated piezoelectric element operable by said electric control signal, and a plunger having one end held against said poppet valve body and movable by said laminated piezoelectric element.

* * * * *

UNITED STATES PATENT AND TRADEMARK OFFICE
CERTIFICATE OF CORRECTION

PATENT NO. : 5,078,239

DATED : January 7, 1992

INVENTOR(S) : Toshiki Kobayashi, et al

It is certified that error appears in the above-identified patent and that said Letters Patent is hereby corrected as shown below:

Please Change

"(21) Appl. No.: 367,652"

to   --(21) Appl. No.: 376,652--

Signed and Sealed this

Twentieth Day of April, 1993

Attest:

MICHAEL K. KIRK

Attesting Officer        Acting Commissioner of Patents and Trademarks